(12) United States Patent
Anthony et al.

(10) Patent No.: US 11,311,023 B2
(45) Date of Patent: Apr. 26, 2022

(54) AUTOMATIC COFFEE MAKER PROCESS FOR PREPARING A COLD BREWED BEVERAGE

(71) Applicant: SharkNinja Operating LLC, Needham, MA (US)

(72) Inventors: Joshua D. Anthony, Billerica, MA (US); Jeremy John Kuempel, Brisbane, CA (US); Matthew Edward Walliser, San Mateo, CA (US); Catherine Bao-Ngoc Tran, San Francisco, CA (US); Jack D. Clark, Brighton, MA (US); Edward J. Scarsella, Brighton, MA (US); Ethan T. Brown, Cambridge, MA (US); Chad P. Woodrow, Somerville, MA (US)

(73) Assignee: SharkNinja Operating LLC, Needham, MA (US)

( * ) Notice: Subject to any disclaimer, the term of this patent is extended or adjusted under 35 U.S.C. 154(b) by 243 days.

(21) Appl. No.: 16/143,003

(22) Filed: Sep. 26, 2018

(65) Prior Publication Data
US 2019/0090503 A1 Mar. 28, 2019

Related U.S. Application Data

(60) Provisional application No. 62/564,043, filed on Sep. 27, 2017.

(51) Int. Cl.
*A47J 31/18* (2006.01)
*A47J 31/52* (2006.01)
(Continued)

(52) U.S. Cl.
CPC ............ *A23F 5/262* (2013.01); *A23F 3/18* (2013.01); *A47J 31/002* (2013.01);
(Continued)

(58) Field of Classification Search
CPC . A23F 5/262; A23F 3/18; A47J 31/002; A47J 31/0615; A47J 31/18; A47J 31/52
See application file for complete search history.

(56) References Cited

U.S. PATENT DOCUMENTS 5,219,394 A * 6/1993 Simmons .............. A47J 31/005
99/299
5,231,918 A * 8/1993 Grzywna ............ A47J 31/0615
99/295

(Continued)

FOREIGN PATENT DOCUMENTS

CN 101600377 A 12/2009
CN 103070247 A 5/2013
(Continued)

OTHER PUBLICATIONS

PCT ISR Written Opinion; International Application No. PCT/US2018/052926; International Filing Date: Sep. 26, 2018; dated Jan. 4, 2019; pp. 1-9.

(Continued)

*Primary Examiner* — Anthony J Weier
(74) *Attorney, Agent, or Firm* — Mintz Levin Cohn Ferris Glovsky and Popeo, PC; Lisa Adams

(57) ABSTRACT

A method of preparing a cold brew beverage includes providing a flavorant, identifying a brew cycle for preparing the cold brew beverage, and performing said brew cycle, wherein performing said brew cycle includes steeping said flavorant within a predetermined volume of water having a temperature between about 30° C. and about 50° C.

21 Claims, 5 Drawing Sheets

(51) Int. Cl.
*A23F 5/26* (2006.01)
*A23F 3/18* (2006.01)
*A47J 31/00* (2006.01)
*A47J 31/06* (2006.01)

(52) U.S. Cl.
CPC ........... *A47J 31/0615* (2013.01); *A47J 31/18* (2013.01); *A47J 31/52* (2013.01)

(56) References Cited

U.S. PATENT DOCUMENTS

| | | | |
|---|---|---|---|
| 6,135,010 A * | 10/2000 | Husted | A47J 31/20 99/319 |
| 7,225,728 B2 | 6/2007 | Lyall, III | |
| 8,663,724 B1 | 3/2014 | Banasik | |
| 2010/0112165 A1 | 5/2010 | Masciandaro et al. | |
| 2010/0223946 A1* | 9/2010 | Fuenten | A47J 31/44 62/320 |
| 2012/0156337 A1* | 6/2012 | Studor | A23F 5/26 426/231 |
| 2014/0178559 A1* | 6/2014 | Neace, Jr. | A23F 5/26 426/594 |
| 2015/0208850 A1* | 7/2015 | Bishop | A23L 2/54 426/231 |
| 2016/0073819 A1* | 3/2016 | Licare | A47J 31/462 426/425 |
| 2016/0183713 A1 | 6/2016 | Simpson | |
| 2016/0296062 A1* | 10/2016 | Gross | A47J 31/0615 |
| 2016/0338522 A1 | 11/2016 | Van Schyndel et al. | |
| 2017/0119195 A1* | 5/2017 | Al-Shaibani | A47J 31/5253 |
| 2017/0202392 A1 | 7/2017 | Mathias | |
| 2017/0360243 A1* | 12/2017 | Crowne | A47J 31/41 |
| 2018/0007926 A1* | 1/2018 | Arroyo | A23F 5/26 |
| 2018/0168388 A1* | 6/2018 | Kim | A47J 31/4475 |
| 2018/0279822 A1* | 10/2018 | Bertash | B65D 85/8046 |
| 2019/0000261 A1* | 1/2019 | McClafferty | A47J 31/06 |
| 2019/0038066 A1* | 2/2019 | Kihara | A47J 31/16 |
| 2019/0053511 A1* | 2/2019 | Gelov | A47J 31/002 |
| 2019/0320840 A1* | 10/2019 | Vastardis | A47J 31/043 |
| 2019/0387920 A1* | 12/2019 | Anthony | A47J 31/0615 |

FOREIGN PATENT DOCUMENTS

| | | | |
|---|---|---|---|
| CN | 104105410 A | | 10/2014 |
| CN | 104138208 A | | 11/2014 |
| CN | 105559633 A | | 5/2016 |
| CN | 106361148 A | | 2/2017 |
| GB | 2187628 | * | 9/1987 |
| JP | H11244150 A | | 9/1999 |
| JP | 2005080698 A | | 3/2005 |
| JP | 2008295398 A | | 12/2008 |
| WO | 2015073732 A1 | | 5/2015 |
| WO | 2016054050 A1 | | 4/2016 |
| WO | 2016164796 A1 | | 10/2016 |

OTHER PUBLICATIONS

PCT Notification of Transmittal of The International Search Report; International Application No. PCT/US2018/052926; International Filing Date: Sep. 26, 2018; dated Jan. 4, 2019; pp. 1-32.

* cited by examiner

AUTOMATIC COFFEE MAKER PROCESS FOR PREPARING A COLD BREWED BEVERAGE

CROSS-REFERENCE TO RELATED APPLICATIONS

This application claims the benefit of U.S. Provisional Application Ser. No. 62/564,043, filed Sep. 27, 2017, which is incorporated herein by reference in its entirety.

BACKGROUND

Exemplary embodiments of the present disclosure relate to a system and method for brewing beverages, and more particularly to a system and method for preparing a cold brewed beverage.

A wide variety of brewing techniques have been developed using hot liquids in combination with the brewing substance as well as ambient or chilled temperature liquids. The different brewing techniques can be used to produce different resultant beverages. One form of cold brewing technique uses a volume of a coffee grinds retained in a filter device in combination with ambient or chilled liquid dispensed into the coffee grinds. This technique can be quite time consuming taking approximately 12-24 hours to produce a batch of finished brewed coffee. This technique steeps or soaks ground coffee over a long period of time in a large volume container such as a bucket and requires draining and filtering after the steeping period. This technique can result in unpredictability and waste due to making a large volume of coffee well in advance of the time it is used. Another cold brewing technique uses a controlled slow dispensing or drip dispensing of ambient or chilled water onto coffee grinds over an extended period of time to limit the contact time the water has with the coffee grinds as it passes through the coffee grinds and the filter for subsequent dispensing into a collection container.

Accordingly, a beverage brewing system capable of efficiently brewing a cold brewed beverage is desirable.

SUMMARY

According to one embodiment, a method of preparing a cold brew beverage includes providing a flavorant, identifying a brew cycle for preparing the cold brew beverage, and performing said brew cycle. Performing said brew cycle includes steeping said flavorant within a predetermined volume of water having a temperature between about 30° C. and about 50° C.

In addition to one or more of the features described above, or as an alternative, in further embodiments said temperature of said predetermined volume of water is dependent of said flavorant.

In addition to one or more of the features described above, or as an alternative, in further embodiments comprising selecting at least one of a volume of beverage to be prepared and a type of flavorant provided, said brew cycle being identified in response to selecting at least one of said volume of beverage to be prepared and said type of flavorant provided.

In addition to one or more of the features described above, or as an alternative, in further embodiments said flavorant is selected from at least a coffee and a tea, said predetermined volume of water having a first temperature when said selected flavorant is coffee and said predetermined volume of water having a second temperature when said selected flavorant is tea.

In addition to one or more of the features described above, or as an alternative, in further embodiments said second temperature is higher than said first temperature.

In addition to one or more of the features described above, or as an alternative, in further embodiments said first temperature is about between about 38° C. and 42° C.

In addition to one or more of the features described above, or as an alternative, in further embodiments said second temperature is about 48° C. and 52° C.

In addition to one or more of the features described above, or as an alternative, in further embodiments said at brew cycle further comprises heating said predetermined volume of water within a heating mechanism.

In addition to one or more of the features described above, or as an alternative, in further embodiments a temperature of said heating mechanism is substantially equal to a temperature of said predetermined volume of water provided to said flavorant.

According to another embodiment, a method of preparing a cold brew beverage includes providing a flavorant, selecting a brew cycle including a plurality of steep cycles, and steeping said flavorant within a volume of water for a predefined length of time. Each of said plurality of steep cycles includes said steeping of said flavorant.

In addition to one or more of the features described above, or as an alternative, in further embodiments one or more parameters varies between said plurality of steep cycles.

In addition to one or more of the features described above, or as an alternative, in further embodiments said predefined length of time decreases progressively with each of said plurality of steep cycles.

In addition to one or more of the features described above, or as an alternative, in further embodiments said volume of water decreases progressively with each of said plurality of steep cycles.

In addition to one or more of the features described above, or as an alternative, in further embodiments steeping said flavorant within said volume of water for said predefined length of time further comprises retaining a steeping valve in a closed position during said predefined length of time.

In addition to one or more of the features described above, or as an alternative, in further embodiments each of said plurality of steep cycles further comprises opening said steeping valve after said predefined length of time to allow said volume of water to drain from said flavorant.

In addition to one or more of the features described above, or as an alternative, in further embodiments comprising selecting at least one of a volume to be prepared and a type of flavorant provided.

In addition to one or more of the features described above, or as an alternative, in further embodiments said brew cycle is selected in response to selecting at least one of said volume to be prepared and said type of flavorant provided.

In addition to one or more of the features described above, or as an alternative, in further embodiments said volume of water and said predefined length of time of each steep cycle are predetermined based on said selected brew cycle.

In addition to one or more of the features described above, or as an alternative, in further embodiments comprising selecting at least one of a configuration and grind size of said flavorant, wherein said total number of steep cycles in said brew cycle is dependent on said at least one of said configuration and said grind size of said flavorant.

According to another embodiment, a method of preparing a cold brew beverage includes selecting a brew cycle including a plurality of steep cycles and performing said brew cycle. Each of said plurality of steep cycles includes steeping said flavorant within a volume of water for a predefined length of time and purging said volume of water from said flavorant.

In addition to one or more of the features described above, or as an alternative, in further embodiments purging said volume of water from said flavorant includes draining said predetermined volume of water via gravity.

In addition to one or more of the features described above, or as an alternative, in further embodiments said flavorant and said volume of water are contained within a brew basket and purging said volume of water further comprises operating a pressure source to increase a pressure within said brew basket.

In addition to one or more of the features described above, or as an alternative, in further embodiments said brew basket is sealed against an adjacent component when said pressure source is operated.

In addition to one or more of the features described above, or as an alternative, in further embodiments said flavorant and said volume of water are contained within a brew basket and wherein said purging said volume of water from said flavorant further comprises opening a steeping valve to expose an opening in said brew basket.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Aspects and embodiments disclosed herein include a system and method for preparing cold brewed beverages. Although the disclosure is described herein with reference to preparing a brewed coffee or tea beverage, preparation of other brewed beverages is within the scope of the disclosure. As the term is used herein, "coffee" refers to a beverage including solids extracted from coffee beans and dissolved in water.

Figure 1:
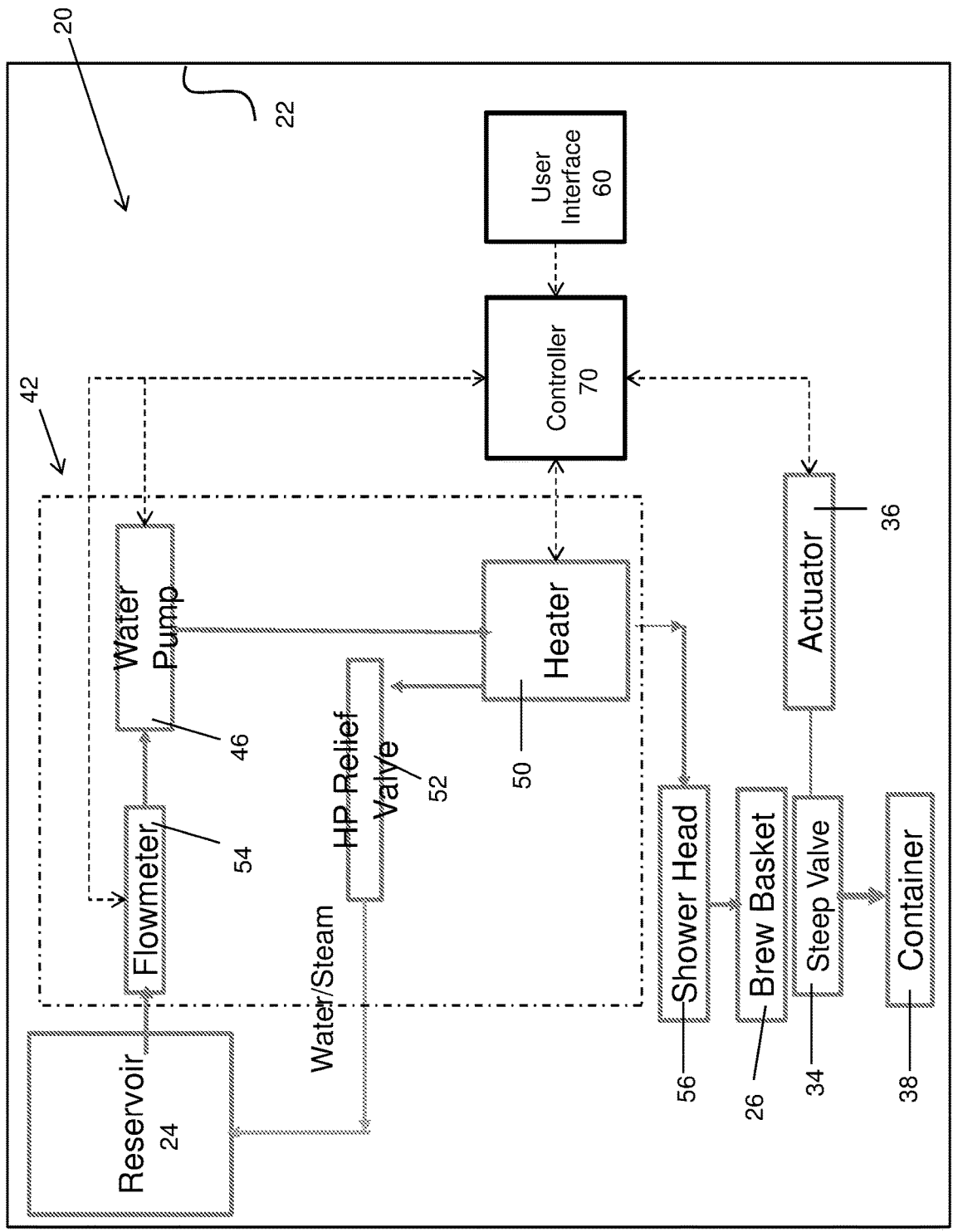
FIG. 1 is a schematic diagram of a beverage brewing apparatus according to an embodiment.
Figure 2:
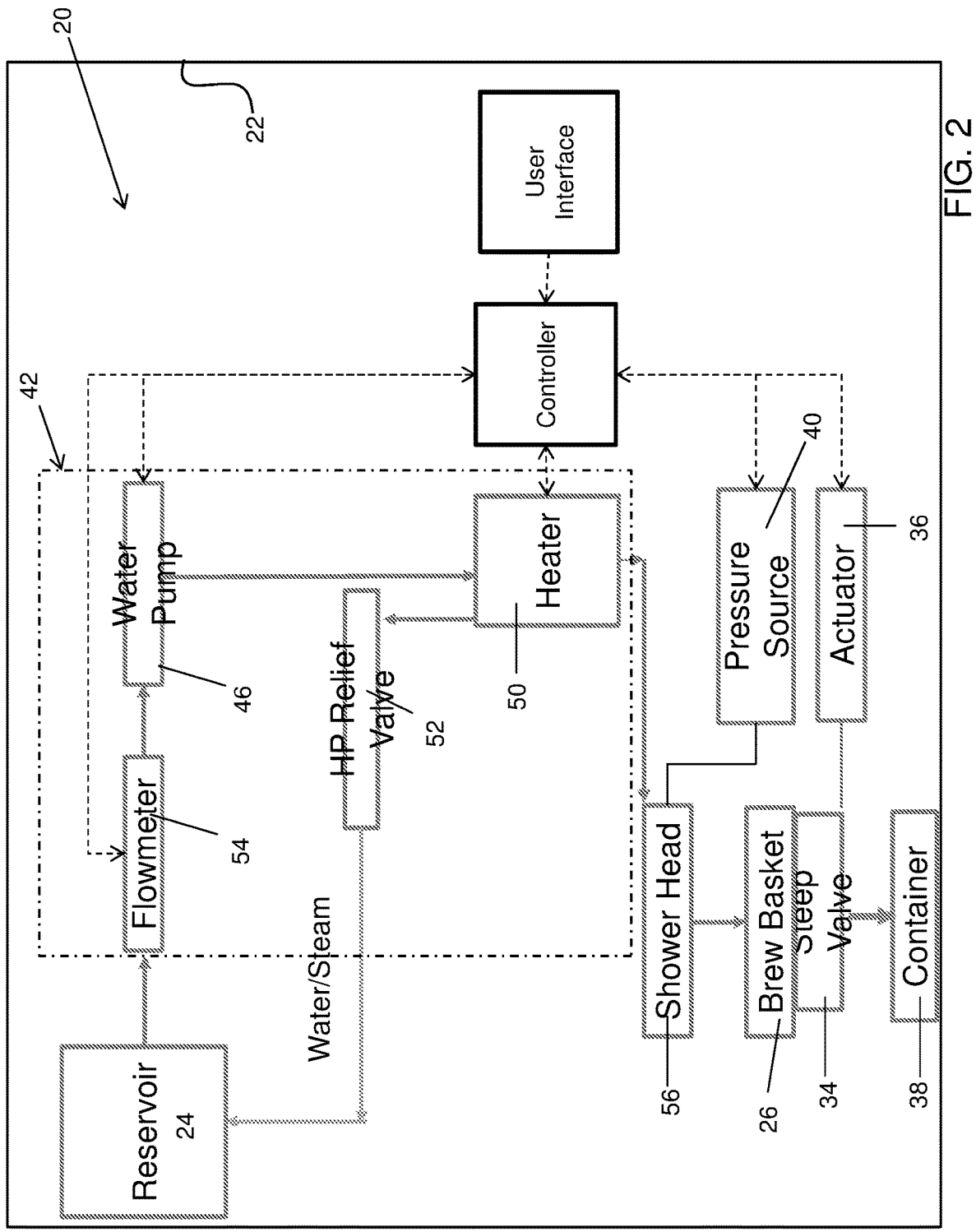
FIG. 2 is a schematic diagram of a beverage brewing apparatus according to another embodiment.
Figure 3:
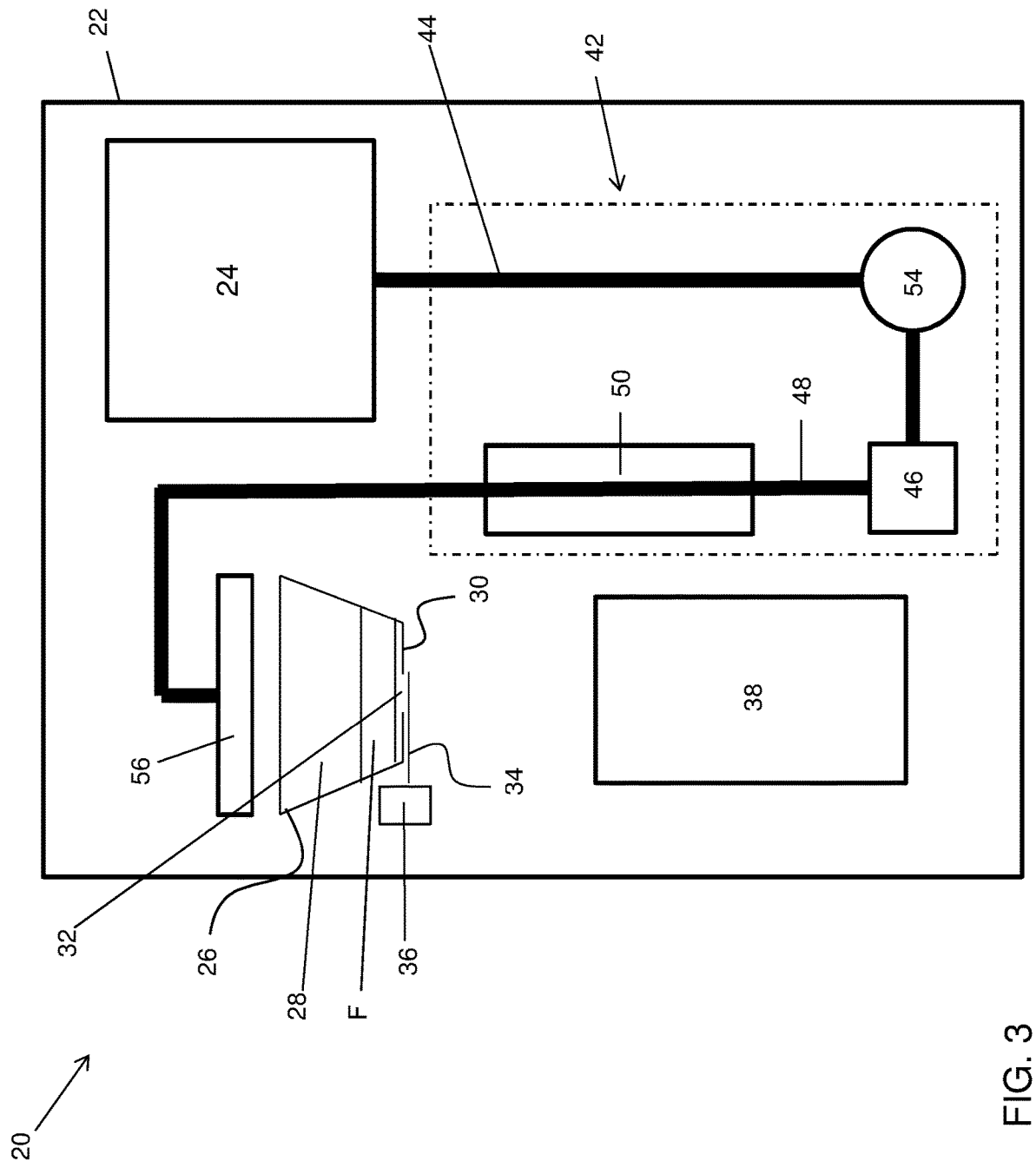
FIG. 3 is a schematic diagram of a beverage brewing apparatus according to an embodiment.

With reference now to FIGS. 1-3, an example of a system configured to prepare a cold brewed beverage is shown. In the illustrated, non-limiting embodiment, the beverage brewing system 20 includes a housing and a water reservoir 24. The water reservoir 24 is configured to store a desired amount of water therein for brewing a beverage, such as coffee for example, and in some embodiments may be removably coupled to the remainder of the housing 22 for ease of use. However, embodiments where the system 20 does not include a water reservoir 24 are also contemplated herein. In such embodiments, the system 20 may be connected to a water source (not shown) and configured to receive a desired amount of water therefrom on demand.

The system 20 additionally includes a generally hollow brew basket 26 having a brew chamber 28 within which a flavorant F, such as coffee grinds or tea leaves may be housed. In an embodiment, the brew chamber 28 is configured to receive a prepackaged cartridge of flavorant. The term "cartridge" is used to encompass any capsule, pod, sachet, wrapper or other container or case containing a material suitable for use with a beverage brewing system. Alternatively, or in addition, the brew basket 26 may be compatible for use with a loose flavorant. In one embodiment, the brew chamber 28 is configured to receive a disposable or permanent filter (not shown) such as commonly used in conjunction with a loose flavorant during a beverage brewing process.

The outlet end 30 of the brew basket 26 typically includes an opening 32 through which water infused with flavorant F is expelled from the brew chamber 28. In an embodiment, a steeping valve 34 arranged adjacent the outlet end 30 is operable to selectively seal the opening 32 and retain water within the brew chamber 28, for example to allow the flavorant F to steep within the water. The steeping valve 34 may be operated between an open and closed position by any suitable means, such as an actuator 36 for example.

From the brew basket 26, the brewed beverage is directed into an adjacent container 38 either directly or through one or more conduits or chambers. Examples of containers 38 suitable for use with the beverage brewing system 20, include, but are not limited to, a carafe, a half-carafe, a travel mug, and a cup or mug for example. In an embodiment, illustrated in FIG. 1, the brewed beverage may be configured to drip via gravity from the opening 32 formed in the outlet end 30 of the brew basket 26 into the adjacent container 38.

In another embodiment, shown in FIG. 2, a pressure source 40 is arranged in fluid communication with the brew chamber 28 and is configured to force the infused water from the brew basket 26. Examples of the pressure source 40 include, but are not limited to a motorized air pump or pressure pump for example, operable to pressurize the interior of the brew basket 26. In such embodiments, the brew basket 26 may be generally sealed against an adjacent component. Further, a valve or other venting mechanism (not shown) associated with the brew chamber 28 of the brew basket 26 may be operated to selectively break the seal between the brew basket 26 and the adjacent component such that pressure is vented or released from the brew chamber 28 to the atmosphere. The valve (not shown) may be operably coupled to the pressure source 40 or to a controller of the beverage brewing system 20, to be described in more detail below.

A water delivery system 42 is configured to communicate water from the water reservoir 24 to the brew basket 26. A first water supply line or fluid conduit 44 extends between an outlet end of the water reservoir 24 and a pumping mechanism 46. A second water supply line 48 connects the downstream end of the pumping mechanism to the brew basket 26. Any suitable type of pumping mechanism 46, including but not limited to a gear pump, peristaltic pump, piston pump, wave pump, and diaphragm pump for example, are within the scope of the disclosure. The pumping mechanism 46 provides a positive pumping action to draw water from the reservoir through the first supply line and deliver the water to the brew chamber 28 of the brew basket 26 via the second supply line 48.

The water delivery system 42 includes a heating mechanism 50 operable to heat the water supplied from the water reservoir 24 to a desired temperature prior to delivery to the brew basket 26. Accordingly, the heating mechanism 50 is disposed generally between the pumping mechanism 46 and the brew basket 26. In an embodiment, the heating mechanism 50 is a flow through heater or boiler configured to heat water within the second supply line 48 as it passes through the heating mechanism 46 for example. However, it should be understood that any suitable heating mechanism 50, such as a heating mechanism including a cavity for retaining a quantity of water and a heating element (not shown) for heating the water retained within the cavity for example, may be included in the water delivery system.

In an embodiment, a pressure relief valve 52 is arranged in communication with the heating mechanism 50 and/or the second supply line 48. The pressure relief valve 52 is selectively operable to release the pressure therefrom by venting steam and/or water. In the illustrated, non-limiting embodiment, the pressure relief valve 52 is arranged in fluid communication with the water reservoir 24 such that vented steam and water may be recycled within the system 20. In other embodiments, the steam may be vented to the atmosphere adjacent the system 20.

The pumping mechanism 46 may be operable for a predetermined period of time to supply a predetermined amount of fluid to the heating mechanism 50, and therefore the brew chamber 28, based on the size of the beverage being prepared. Alternatively, or in addition, a flow meter 54 may be used to monitor the amount of fluid that passes there through. The flow meter may be located between the water reservoir 24 and the pumping mechanism 46, as shown in FIGS. 1 and 2, or alternatively, at another location within the water delivery system 42. The amount of fluid that passes through the flow meter 54 may represent the amount of fluid provided to the brew chamber 28 of the brew basket 26. Various types of flow meters are within the scope of the disclosure.

After being heated within the heating mechanism 50, the water is delivered to the brew chamber 28 of the brew basket 26. In the illustrated, non-limiting embodiment, a shower head 56 is positioned directly adjacent an end of the brew basket 28 and is configured to receive the heated water from the second supply line 48. The shower head 56 typically includes a plurality of openings (not shown) that distribute water over the flavorant F within in the brew chamber 28.

The beverage brewing system 20 includes a user interface 60 for receiving one or more inputs from a user. In an embodiment, the user interface 60 may include one or more buttons, knobs, or other control input devices (not shown), such as for selecting one of a plurality of sizes. Alternatively, the user interface 60 may include a touch screen, or may be configured to receive an input via an "app" such as through a smart device such as a phone or tablet. The selectable brew sizes may include a mug (between about 6 and about 10 ounces), an extra-large mug (between about 8 and about 12 ounces), a travel mug (between about 12 and about 16 ounces), an extra-large travel mug (between about 16 and about 24 ounces), a half-carafe (between approximately 24 and 34 ounces), and a carafe (between about 44 and about 54 ounces). The user interface may additionally include an input device for selecting one of a plurality of types of beverage to be brewed, such as coffee or tea (teas include black, herbal, oolong, white, green, and delicate), and for selecting a brew style.

Operation of the beverage brewing apparatus 20 is controlled by a controller 70 operably coupled to the pumping mechanism 46, the flow meter 54, the heating mechanism 50, the actuator 36 associated with the steeping valve 34, and in some embodiments the pressure source 40 in response to the input signals received from the user interface 60. The controller 70 may include one or more or a microprocessor, microcontroller, application specific integrated circuit (ASIC), or any other form of electronic controller known in the art. In an embodiment, the system includes one or more temperature sensors, such as located adjacent the reservoir 24, the inlet and/or the outlet of the heating mechanism 50 for example, for measuring the temperature of the water within the water delivery system 42. The controller 70 is operable to control the water delivery system to ensure that the heating mechanism 50, and therefore the water provided to the brew chamber 28, has a desired temperature.

Figure 4:
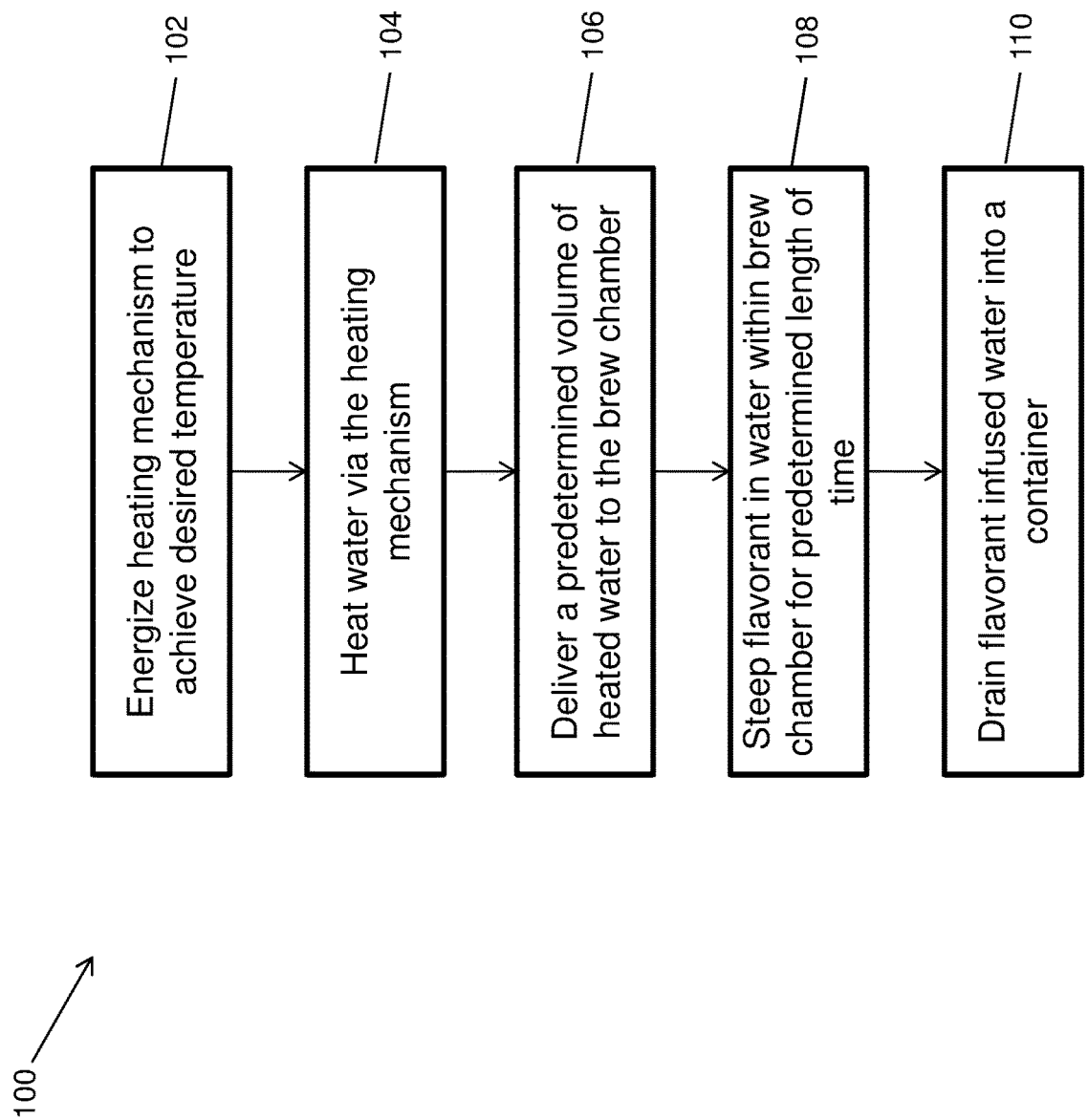
FIG. 4 is a flow diagram of a steep cycle according to an embodiment.

Preparation of a cold brew beverage using the system 20 is configured to generate a beverage having a desired flavor profile. With reference to FIG. 4, in embodiments where a cold brewed coffee is output from the system 20, the cold brew concentrate output from the brew basket 26 has an extraction between about 18% and 22%, and a percentage of total dissolved solids (% TDS) between about 2.4% and about 2.8%. The brewed beverage is intended to be received within a container 38 filled at least half way full with whole ice cubes. Accordingly, the temperature of brewed beverage will cause a portion of the ice within the container 38 to melt, thereby diluting the beverage within the container 38. The resultant, ready to drink cold brew beverage within the container 38 has a % TDS between about 1.9% and about 2.1%, and an extraction between 18% and 22%.

Various parameters associated with a brew cycle for preparing a cold brewed beverage for each combination of selectable flavorants and sizes are stored within and/or accessible by the controller 70. The stored parameters for each brew cycle are associated with a recommended volume of flavorant. The recommended or suggested volume of flavorant is dependent not only on the size of the beverage being prepared, but also on the type of flavorant being used. For example, the suggested amount of flavorant used to prepare a cup of cold brew black tea may be different than the suggested amount of flavorant used to prepare a cup of cold brew green tea. In embodiments where the beverage being prepared is a cold brew coffee, the suggested amount of flavorant i.e. coffee grinds, is scaled roughly linearly based on the size of the beverage being prepared. In an embodiment, the amount of flavorant recommended when preparing a 9 ounce coffee is approximately 25 grams and the amount of flavorant recommended when preparing an 18 ounce coffee is approximately 50 grams.

The stored parameters associated with each brew cycle for preparing a brewed beverage generally include a total number of steep cycles and a water temperature, volume of water, and steep duration for each steep cycle. Each brew cycle associated with the preparation of a cold brew beverage includes one or more steep cycles. The total number of steeps within a brew cycle can be adjusted to achieve a desired flavor profile given the beverage type, brew size, and brew style.

Figure 5:
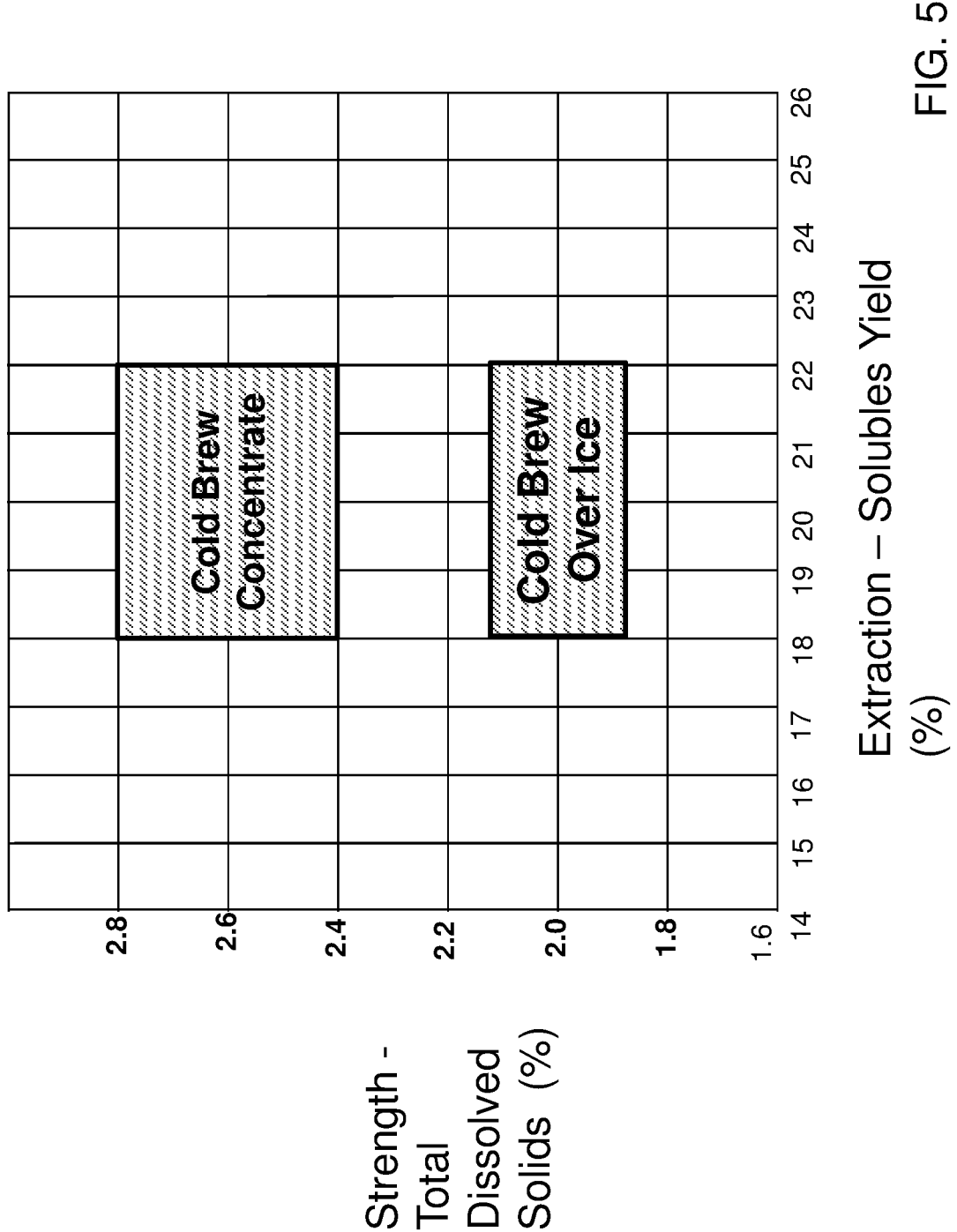
FIG. 5 is a graph representing Strength (% TDS) vs. Extraction (%) of Brewed Coffee according to an embodiment.

A flow diagram of a steep cycle 100 is illustrated in FIG. 5. Each steep cycle first includes energizing the heating mechanism 50 to a predefined temperature, as shown in block 102. Operation of the water delivery system 42 is then initiated, as shown in block 104, to provide water to the heating mechanism 50. The pumping mechanism 46 is configured to move the water through the heating mechanism 50 with a controlled flow rate intended to maximize the heat transfer to the water and thereby minimize the volume of water below the predefined temperature. Operation of the pumping mechanism 46 continues until a predetermined volume of heated water is delivered to the brew chamber 28 of the brew basket 26, shown in block 106. After the predetermined volume of heated water is delivered to the brew chamber 26, the pumping mechanism 46 and the heating mechanism 50 are de-energized.

As the water is supplied into the brew chamber 28, the steeping valve 34 is in a closed position. Accordingly, the water will accumulate within the brew chamber 28, thereby allowing the flavorant to "steep" within the water. After delivery of the water to the brew chamber 28, the steeping valve 34 remains closed for a predetermined length of time, shown in block 108. After this steeping time has elapsed, the steeping valve 34 is opened for a specific amount of time and the flavorant infused water is allowed to drain through the opening 32 formed in the outlet end 30 of the brew basket 26 into an adjacent container 38, as shown in block 110. As previously described, the infused water may drain via gravity, or in response to an air purge generated by operation of the pressure source 40.

The total number of steep cycles performed by the system 20 within a brew cycle will vary based on several factors including the arrangement of the flavorant, and more specifically whether the flavorant is loose or arranged within a cartridge. For example, a brew cycle for preparing a cold brew coffee using loose grounds in an open brew basket 26 typically requires fewer steep cycles than the brew cycle for preparing a cold brew coffee using a cartridge to achieve proper extraction. Similarly, preparation of a cold brew tea using whole leaf tea may require more steeps, or alternatively, a different number of steeps than if the flavorant were arranged within a tea bag for example. In addition, total number of steep cycles may also vary based on the grind size of the flavorant, which can affect the extraction thereof. In embodiments where the flavorant has a fine grind size, flavor will extract more quickly than from a flavorant having a larger or coarser grind size. Accordingly, the brew cycle can be adapted to compensate both for the configuration (loose or in a cartridge) and size of the flavorant being used to achieve a desired flavor profile.

In embodiments where a brew cycle includes a plurality of steep cycles, each of the plurality of steep cycles may be the same, or alternatively, may be different. In an embodiment, during preparation of a beverage having multiple steep cycles, the length of the steeps of each steep cycle may decrease sequentially. Using longer steeps followed by progressively shorter steeps can enhance the flavor profile of the resulting beverage. In an embodiment, the volume of water provided to the brew chamber 28 is dependent on the length of the steep. As a result, the volume of water may also progressively decrease with each steep cycle. However, embodiments where the steeps are equal lengths and the volumes of water are equal, increase sequentially, or vary randomly are also contemplated herein.

Further, during preparation of a cold brewed beverage, the temperature of the water delivered to the brew chamber 28 may affect the overall taste of the beverage produced by the system 20. If the water is too cold, extraction from the flavorant may be low, and alternatively, if the water is too hot, too much acidity may be released from the coffee grinds, and too much astringency may be released from the tea leaves. During preparation of a cold brew beverage, the water temperature associated with each steep cycle is between about 30° C. and about 50° C. In an embodiment, the water temperature associated with preparation of a tea beverage is generally warmer, for example between 48° C. and 52° C., such as 50° C., than the water temperature associated with preparation of a coffee beverage, generally between 38° C. and 42° C., for example 40° C. In an embodiment, where preparation of a cold brew beverage requires multiple steep cycles, the temperature of each steep cycle remains constant.

Examples of the parameters including the total number of steep cycles, and the water temperature and length of steep for each steep cycle, are shown below in Tables 1A-1F, for preparation of a cold brewed coffee of various sizes, and in Tables 2A-2C for preparation of a cold brew black tea of various sizes. The brew cycles shown below are intended as an example only.

TABLE 1A

Example of Brew Cycle Parameters for Cup of Cold Brewed Coffee

Cold Brew Coffee - Cup

| Steep Cycle | Step | Duration | Temperature |
|---|---|---|---|
| 1 | Boiler Preheat | 0-15 seconds | 40 C. |
|  | Water Preheat | N/A | 40 C. |
|  | Water Delivery | 70 mL | 40 C. |
|  | Steep | 180 seconds | N/A |
|  | Drain | 30 seconds | N/A |
| 2 | Boiler Preheat | 0-15 seconds | 40 C. |
|  | Water Preheat | N/A | 40 C. |
|  | Water Delivery | 48 mL | 40 C. |
|  | Steep | 120 seconds | N/A |
|  | Drain | 30 seconds | N/A |
| 3 | Boiler Preheat | 0-15 seconds | 40 C. |
|  | Water Preheat | N/A | 40 C. |
|  | Water Delivery | 44 mL | 40 C. |
|  | Steep | 100 seconds | N/A |
|  | Drain | 30 seconds | N/A |
| 4 | Boiler Preheat | 0-15 seconds | 40 C. |
|  | Water Preheat | N/A | 40 C. |
|  | Water Delivery | 42 mL | 40 C. |
|  | Steep | 60 seconds | N/A |
|  | Drain | 45 seconds | N/A |

TABLE 1B

Example of Brew Cycle Parameters for XL Cup of Cold Brewed Coffee

Cold Brew Coffee - XL Cup

| Steep Cycle | Step | Duration | Temperature |
|---|---|---|---|
| 1 | Boiler Preheat | 0-15 seconds | 40 C. |
|  | Water Preheat | N/A | 40 C. |
|  | Water Delivery | 80 mL | 40 C. |
|  | Steep | 180 seconds | N/A |
|  | Drain | 30 seconds | N/A |
| 2 | Boiler Preheat | 0-15 seconds | 40 C. |
|  | Water Preheat | N/A | 40 C. |
|  | Water Delivery | 68 mL | 40 C. |
|  | Steep | 120 seconds | N/A |
|  | Drain | 30 seconds | N/A |
| 3 | Boiler Preheat | 0-15 seconds | 40 C. |
|  | Water Preheat | N/A | 40 C. |
|  | Water Delivery | 64 mL | 40 C. |
|  | Steep | 100 seconds | N/A |
|  | Drain | 30 seconds | N/A |
| 4 | Boiler Preheat | 0-15 seconds | 40 C. |
|  | Water Preheat | N/A | 40 C. |
|  | Water Delivery | 62 mL | 40 C. |
|  | Steep | 60 seconds | N/A |
|  | Drain | 45 seconds | N/A |

TABLE 1C

Example of Brew Cycle Parameters for Travel Mug of Cold Brewed Coffee

Cold Brew Coffee - Travel Mug

| Steep Cycle | Step | Duration | Temperature |
|---|---|---|---|
| 1 | Boiler Preheat | 0-15 seconds | 40 C. |
|   | Water Preheat | N/A | 40 C. |
|   | Water Delivery | 100 mL | 40 C. |
|   | Steep | 210 seconds | N/A |
|   | Drain | 30 seconds | N/A |
| 2 | Boiler Preheat | 0-15 seconds | 40 C. |
|   | Water Preheat | N/A | 40 C. |
|   | Water Delivery | 80 mL | 40 C. |
|   | Steep | 150 seconds | N/A |
|   | Drain | 30 seconds | N/A |
| 3 | Boiler Preheat | 0-15 seconds | 40 C. |
|   | Water Preheat | N/A | 40 C. |
|   | Water Delivery | 80 mL | 40 C. |
|   | Steep | 120 seconds | N/A |
|   | Drain | 30 seconds | N/A |
| 4 | Boiler Preheat | 0-15 seconds | 40 C. |
|   | Water Preheat | N/A | 40 C. |
|   | Water Delivery | 74 mL | 40 C. |
|   | Steep | 60 seconds | N/A |
|   | Drain | 60 seconds | N/A |

TABLE 1D

Example of Brew Cycle Parameters for XL Travel Mug of Cold Brewed Coffee

Cold Brew Coffee - XL Travel Mug

| Steep Cycle | Step | Duration | Temperature |
|---|---|---|---|
| 1 | Boiler Preheat | 0-15 seconds | 40 C. |
|   | Water Preheat | N/A | 40 C. |
|   | Water Delivery | 132 mL | 40 C. |
|   | Steep | 210 seconds | N/A |
|   | Drain | 30 seconds | N/A |
| 2 | Boiler Preheat | 0-15 seconds | 40 C. |
|   | Water Preheat | N/A | 40 C. |
|   | Water Delivery | 106 mL | 40 C. |
|   | Steep | 150 seconds | N/A |
|   | Drain | 30 seconds | N/A |
| 3 | Boiler Preheat | 0-15 seconds | 40 C. |
|   | Water Preheat | N/A | 45 C. |
|   | Water Delivery | 96 mL | 40 C. |
|   | Steep | 120 seconds | N/A |
|   | Drain | 30 seconds | N/A |
| 4 | Boiler Preheat | 0-15 seconds | 40 C. |
|   | Water Preheat | N/A | 40 C. |
|   | Water Delivery | 96 mL | 40 C. |
|   | Steep | 60 seconds | N/A |
|   | Drain | 60 seconds | N/A |

TABLE 1E

Example of Brew Cycle Parameters for Half-Carafe of Cold Brewed Coffee

Cold Brew Coffee - Half Carafe

| Steep Cycle | Step | Duration | Temperature |
|---|---|---|---|
| 1 | Boiler Preheat | 0-15 seconds | 40 C. |
|   | Water Preheat | N/A | 40 C. |
|   | Water Delivery | 220 mL | 40 C. |
|   | Steep | 180 seconds | N/A |
|   | Drain | 30 seconds | N/A |

TABLE 1E-continued

Example of Brew Cycle Parameters for Half-Carafe of Cold Brewed Coffee

Cold Brew Coffee - Half Carafe

| Steep Cycle | Step | Duration | Temperature |
|---|---|---|---|
| 2 | Boiler Preheat | 0-15 seconds | 40 C. |
|   | Water Preheat | N/A | 40 C. |
|   | Water Delivery | 160 mL | 40 C. |
|   | Steep | 150 seconds | N/A |
|   | Drain | 30 seconds | N/A |
| 3 | Boiler Preheat | 0-15 seconds | 40 C. |
|   | Water Preheat | N/A | 40 C. |
|   | Water Delivery | 150 mL | 40 C. |
|   | Steep | 120 seconds | N/A |
|   | Drain | 30 seconds | N/A |
| 4 | Boiler Preheat | 0-15 seconds | 40 C. |
|   | Water Preheat | N/A | 40 C. |
|   | Water Delivery | 140 mL | 40 C. |
|   | Steep | 60 seconds | N/A |
|   | Drain | 60 seconds | N/A |

TABLE 1F

Example of Brew Cycle Parameters for Carafe of Cold Brewed Coffee

Cold Brew Coffee - Carafe

| Steep Cycle | Step | Duration | Temperature |
|---|---|---|---|
| 1 | Boiler Preheat | 0-15 seconds | 40 C. |
|   | Water Preheat | N/A | 40 C. |
|   | Water Delivery | 294 mL | 40 C. |
|   | Steep | 180 seconds | N/A |
|   | Drain | 30 seconds | N/A |
| 2 | Boiler Preheat | 0-15 seconds | 40 C. |
|   | Water Preheat | N/A | 40 C. |
|   | Water Delivery | 240 mL | 40 C. |
|   | Steep | 150 seconds | N/A |
|   | Drain | 30 seconds | N/A |
| 3 | Boiler Preheat | 0-15 seconds | 40 C. |
|   | Water Preheat | N/A | 40 C. |
|   | Water Delivery | 220 mL | 40 C. |
|   | Steep | 120 seconds | N/A |
|   | Drain | 30 seconds | N/A |
| 4 | Boiler Preheat | 0-15 seconds | 40 C. |
|   | Water Preheat | N/A | 40 C. |
|   | Water Delivery | 110 mL | 40 C. |
|   | Steep | 60 seconds | N/A |
|   | Drain | 60 seconds | N/A |

TABLE 2A

Example of Brew Cycle Parameters for XL Cup of Cold Brewed Black Tea

Cold Brew Black Tea - XL Cup

| Steep Cycle | Step | Duration | Temperature |
|---|---|---|---|
| 1 | Boiler Preheat | 0-15 seconds | 50 C. |
|   | Water Preheat | N/A | 50 C. |
|   | Water Delivery | 190 mL | 50 C. |
|   | Steep | 510 seconds (8.5 minutes) | N/A |
|   | Drain | 33 seconds | N/A |

TABLE 2B

Example of Brew Cycle Parameters for XL Travel Mug of Cold Brewed Black Tea

Cold Brew Black Tea - XL Travel Mug

| Steep Cycle | Step | Duration | Temperature |
|---|---|---|---|
| 1 | Boiler Preheat | 0-15 seconds | 50 C. |
|  | Water Preheat | N/A | 50 C. |
|  | Water Delivery | 298 mL | 50 C. |
|  | Steep | 480 seconds (8.0 minutes) | N/A |
|  | Drain | 42 seconds | N/A |

TABLE 2C

Example of Brew Cycle Parameters for Carafe of Cold Brewed Black Tea

Cold Brew Black Tea - Carafe

| Steep Cycle | Step | Duration | Temperature |
|---|---|---|---|
| 1 | Boiler Preheat | 0-15 seconds | 50 C. |
|  | Water Preheat | N/A | 50 C. |
|  | Water Delivery | 300 mL | 50 C. |
|  | Steep | 380 seconds (6:20 minutes) | N/A |
|  | Drain | 30 seconds | N/A |
| 2 | Boiler Preheat | 0-15 seconds | 50 C. |
|  | Water Preheat | N/A | 50 C. |
|  | Water Delivery | 300 mL | 50 C. |
|  | Steep | 75 seconds (1:15 minutes) | N/A |
|  | Drain | 30 seconds | N/A |
| 3 | Boiler Preheat | 0-15 seconds | 50 C. |
|  | Water Preheat | N/A | 50 C. |
|  | Flow Through Water Delivery | 99 mL | 50 C. |
|  | Drain | 20 seconds | N/A |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of preparing a cold brew beverage comprising:
providing a flavorant;
selecting a type of cold brew beverage to be prepared via an input, wherein said type of cold brew beverage to be prepared is dependent on said flavorant;
identifying a brew cycle for preparing the cold brew beverage, said brew cycle including a plurality of sequential steep cycles; and
performing said brew cycle, wherein performing said brew cycle includes steeping said flavorant during each of said plurality of sequential steep cycles for a predetermined length of time within a predetermined volume of water having a temperature between about 30° C. and about 50° C., wherein said predetermined length of time decreases progressively with each of said plurality of sequential steep cycles to define longer steeps followed by progressively shorter steeps.

2. The method of claim 1, further comprising selecting at least one of a volume of beverage to be prepared and a type of said flavorant provided, said brew cycle being identified in response to selecting at least one of said volume of beverage to be prepared and said type of said flavorant provided.

3. The method of claim 2, wherein said flavorant is selected from at least a coffee and a tea, said predetermined volume of water having a first temperature when said selected flavorant is coffee and said predetermined volume of water having a second temperature when said selected flavorant is tea.

4. The method of claim 3, wherein said first temperature is between about 38° C. and 42° C.

5. The method of claim 3, wherein said second temperature is between about 48° C. and 52° C.

6. The method of claim 1, wherein said brew cycle further comprises heating said predetermined volume of water within a heating mechanism.

7. The method of claim 6, wherein a temperature of said heating mechanism is substantially equal to a temperature of said predetermined volume of water provided to said flavorant.

8. A method of preparing a cold brew beverage using a beverage brewing system, the method comprising:
providing a water source and a flavorant within a brew chamber;
selecting a brew cycle including a plurality of sequential steep cycles;
steeping said flavorant within a volume of water provided from said water source for a predefined length of time, wherein said predetermined length of time decreases progressively with each of said plurality of sequential steep cycles to define longer steeps followed by progressively shorter steeps; and dispensing said volume of water from said brew chamber into a container separable from the beverage brewing system, said container being filled at least partially with ice, wherein said plurality of sequential steep cycles are performed sequentially and each of said plurality of sequential steep cycles includes said steeping of said flavorant and said dispensing of said volume of water into said container filled at least partially with ice.

9. The method of claim 8, wherein one or more parameters varies between said plurality of steep cycles.

10. The method of claim 8, wherein said volume of water decreases progressively with each of said plurality of steep cycles.

11. The method of claim 8, wherein steeping said flavorant within said volume of water for said predefined length of time further comprises retaining a steeping valve in a closed position during said predefined length of time.

12. The method of claim 11, wherein each of said plurality of steep cycles further comprises opening said steeping valve after said predefined length of time to dispense said volume of water to drain from said flavorant into said container.

13. The method of claim 8, further comprising selecting at least one of a volume to be prepared and a type of flavorant provided.

14. The method of claim 13, wherein said brew cycle is selected in response to selecting at least one of said volume to be prepared and said type of flavorant provided.

15. The method of claim 13, wherein said volume of water and said predefined length of time of each steep cycle are predetermined based on said selected brew cycle.

16. The method of claim 13, further comprising electing at least one of an arrangement and grind size of said flavorant, wherein said total number of steep cycles in said brew cycle is dependent on said at least one of said arrangement and said grind size of said flavorant.

17. A method of preparing a cold brew beverage comprising:

selecting a brew cycle from a plurality of brew cycles, wherein said brew cycle including a plurality of sequential steep cycles and each of said plurality of sequential steep cycles includes:

releasing a volume of water from a water reservoir;

controlling a temperature of said volume of water to form a conditioned volume of water;

delivering said conditioned volume of water from a fluid source to a brew basket containing a flavorant;

steeping said flavorant within said conditioned volume of water for a predefined length of time, wherein said during said steeping, said conditioned volume of water is retained within said brew basket; and purging said conditioned volume of water from said flavorant to a container, wherein during said purging, said conditioned volume of water is expelled through an outlet of said brew basket; and performing said plurality of sequential steep cycles of said selected brew cycle, wherein said predetermined length of time decreases progressively with each of said plurality of sequential steep cycles to define longer steeps followed by progressively shorter steeps, and for each of said plurality of sequential steep cycles said conditioned volume of water is delivered to said same brew basket and said condition volume of water of is purged into said same container.

18. The method of claim 17, wherein purging said volume of water from said flavorant includes draining said predetermined volume of water via gravity.

19. The method of claim 17, wherein purging said volume of water further comprises operating a pressure source to increase a pressure within a brew basket, said volume of water being located within said brew basket.

20. The method of claim 19, wherein said brew basket is sealed against an adjacent component when said pressure source is operated.

21. The method of claim 17, wherein said flavorant and said volume of water are contained within a brew basket and wherein said purging said volume of water from said flavorant further comprises opening a steeping valve to expose an opening in said brew basket.

* * * * *